(12) United States Patent
Kouguchi

(10) Patent No.: US 8,780,408 B2
(45) Date of Patent: Jul. 15, 2014

(54) IMAGE PROCESSING APPARATUS, IMAGE PROCESSING METHOD AND RECORDING MEDIUM

(75) Inventor: Masatsugu Kouguchi, Hachioji (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 164 days.

(21) Appl. No.: 13/477,251

(22) Filed: May 22, 2012

(65) Prior Publication Data

US 2012/0300232 A1    Nov. 29, 2012

(30) Foreign Application Priority Data

May 23, 2011    (JP) .................................. 2011-114391

(51) Int. Cl.
| | |
|---|---|
| H04N 1/60 | (2006.01) |
| G03F 3/08 | (2006.01) |
| H04N 1/46 | (2006.01) |
| G06K 9/00 | (2006.01) |
| G06K 9/40 | (2006.01) |

(52) U.S. Cl.
USPC ............ 358/1.9; 358/523; 358/524; 382/162; 382/165; 382/167; 382/274

(58) Field of Classification Search
USPC ........ 358/1.9, 523, 524; 347/3; 382/165, 167, 382/274, 162
See application file for complete search history.

(56) References Cited

U.S. PATENT DOCUMENTS 7,580,150 B2 *  8/2009  Mahy et al. ..................... 358/1.9
8,280,161 B2 * 10/2012  Dalal et al. ..................... 382/167

FOREIGN PATENT DOCUMENTS

| JP | 2005-223695 A | 8/2005 |
| JP | 2005-278074 A | 10/2005 |

* cited by examiner

Primary Examiner — Charlotte M Baker
(74) Attorney, Agent, or Firm — Buchana Ingersoll & Rooney PC

(57) ABSTRACT

An image processing apparatus processes image data including first data corresponding to an output color of an output device and a plurality of second data of respective spot colors. The image processing apparatus includes a conversion section and a storage section. The conversion section calculates a device color value for a spot color or a spot color combination among the spot colors, referring to a first table, to generate a second table. In the second table, spot color identification information on the spot color or the spot color combination is correlated with the device color value. The conversion section also generates third data based on the plurality of second data. In the third data, each pixel is represented by the spot color identification information. The storage section stores the first data, the second table and the third data.

12 Claims, 19 Drawing Sheets

FIG.3

SPOT COLOR TABLE

T1

| SPOT COLOR NAME | CMYK VALUE |
|---|---|
| Green | 100,0,100,0 |
| Orange | 0,100,100,0 |
| ⋮ | ⋮ |

FIG.4

COMBINED SPOT COLOR REPLACEMENT TABLE

T2

| ID | SPOT COLOR NAME | CMYK VALUE |
|---|---|---|
| 1 | Green | 100,0,100,0 |
| 2 | Green+Orange | 100,100,100,0 |
| 3 | Orange | 0,100,100,0 |
| ⋮ | ⋮ | ⋮ |

COMBINED SPOT COLOR DATA

CMYK DATA D1

SPOT COLOR CMYK DATA D4

COMBINED CMYK DATA D5

FIG.18

CORRECTED SPOT COLOR TABLE  T1

| SPOT COLOR NAME | CMYK VALUE |
|---|---|
| Green | 90,0,100,10 |
| Orange | 0,100,100,0 |
| ⋮ | ⋮ |

FIG.19

CORRECTED COMBINED SPOT COLOR REPLACEMENT TABLE

T2

| ID | SPOT COLOR NAME | CMYK VALUE |
|---|---|---|
| 1 | Green | 90,0,100,10 |
| 2 | Green+Orange | 90,100,100,10 |
| 3 | Orange | 0,100,100,0 |
| ⋮ | ⋮ | ⋮ |

IMAGE PROCESSING APPARATUS, IMAGE PROCESSING METHOD AND RECORDING MEDIUM

BACKGROUND OF THE INVENTION

1. Field of the Invention

The present invention relates to an image processing apparatus, an image processing method and a recording medium.

2. Description of the Related Art

These days, in the production printing market, an MFP (Multi Function Peripheral) is often used as a POD (Print On Demand) solution instead of an offset printer. This is because the MFP is strong in small-lot production of various products and short-run production. In general, in an MFP, colors are reproduced by using cyan (C), magenta (M), yellow (Y) and black (K) color materials (toners). The C, M, Y and K are so-called process colors. In raster image processing to generate image data (CMYK data) from a print job, colors are converted into device-dependent CMYK values (device color values) by using an ICC (International Color Consortium) profile to perform printing. On the other hand, in offset printing, printing is sometimes performed by using color (spot color) ink. The colors (spot colors) are different from the process colors. The spot color ink (spot colors) varies depending on ink manufacturers, and hence there are thousands of kinds of spot color ink.

In POD printing, in general, documents are created with RGB or CMYK. However, logos, marks or the like of organizations are sometimes specified by spot colors. Therefore, it has been important for MPFs too to deal with spot colors not only for proofs but also for commercial printing. In order to deal with spot colors, Japanese Patent Application Laid-Open Publication No. 2005-223695 and Japanese Patent Application Laid-Open Publication No. 2005-278074 propose performing color conversion on image data for printing including spot colors, referring to a spot color table in which spot color names are respectively correlated with values of converted colors. According to the publications, when printing is performed, each spot color is converted into a CMYK value by using the spot color table, and the CMYK value is combined with a CMYK value outputted to a printer.

Furthermore, in a workflow of POD, so-called job storage/editing function and reprint function are important. With the functions, image data on which raster image processing and/or color conversion are already performed is temporarily stored in an MFP; trial printing to check an output setting, colors and image positions as a final check before printing is performed; setting change and/or some adjustment (color adjustment) are performed as needed; and then the printing (reprinting) is performed.

However, in such a case where reprinting is performed after spot color adjustment is performed (a spot color table is changed), conventionally, it is necessary to re-send a print job and/or to re-perform raster image processing, and/or it is necessary to store a plurality of spot color data of respective spot colors in addition to normal CMYK data when image data is stored in an MFP, and to combine the plurality of spot color data with the CMYK data when printing (reprinting) is performed. Thus, conventional methods require a large storage region to store data and/or much time to perform processing.

SUMMARY OF THE INVENTION

The present invention is made in view of the abovementioned problems of the conventional technologies. An object of the present invention is to reduce the amount of data stored when image data including spot colors is stored.

In order to achieve at least one of the above-mentioned objects, according to a first aspect of the present invention, there is provided an image processing apparatus which processes image data including: first data corresponding to an output color of an output device; and a plurality of second data of respective spot colors, the image processing apparatus including: a conversion section which (i) calculates a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generates, based on the plurality of second data, third data in which each pixel is represented by the spot color identification information; and a storage section which stores the first data, the second table and the third data.

In order to achieve at least one of the above-mentioned objects, according to a second aspect of the present invention, there is provided an image processing method for processing image data including: first data corresponding to an output color of an output device; and a plurality of second data of respective spot colors, the image processing method including: a conversion step of (i) calculating a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generating, based on the plurality of second data, third data in which each pixel is represented by the spot color identification information; and a storage step of storing the first data, the second table and the third data.

In order to achieve at least one of the above-mentioned objects, according to a third aspect of the present invention, there is provided a computer readable recording medium storing a program making a computer, which processes image data including: first data corresponding to an output color of an output device; and a plurality of second data of respective spot colors, function as: a conversion section which (i) calculates a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generates, based on the plurality of second data, third data showing in which each pixel is represented by the spot color identification information; and a storage section which stores the first data, the second table and the third data.

BRIEF DESCRIPTION OF THE SEVERAL VIEWS OF THE DRAWING

The present invention will be fully understood by the following detailed description and the accompanying drawings, which are not intended to limit the present invention, wherein:

FIG. 3 shows an example of a spot color table;

FIG. 4 shows an example of a combined spot color replacement table;

FIG. 18 shows an example of a corrected spot color table; and

FIG. 19 shows an example of a corrected combined spot color replacement table.

DETAILED DESCRIPTION OF THE INVENTION

In the following, an image processing apparatus in accordance with an embodiment of the present invention is described.

In the embodiment, first data, second data, third data and fourth data are described as device color data (CMYK data), spot color data, combined spot color data and spot color device color data (spot color CMYK data), respectively. Also, in the embodiment, a first table and a second table are described as a spot color table and a combined spot color replacement table, respectively. In addition, in the embodiment, a conversion section, a combination section and an adjustment section are described as a spot color conversion section, a spot color combination section and a spot color adjustment section, respectively.

Figure 1:
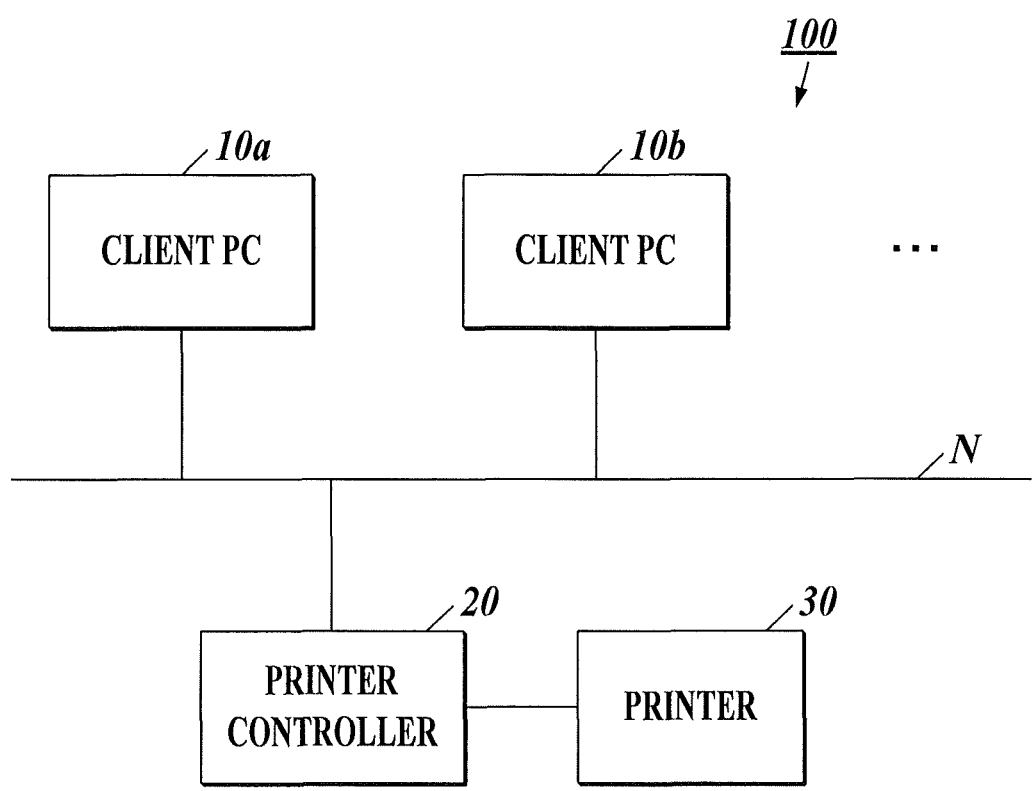
FIG. 1 is a block diagram showing a configuration of an image forming system.

FIG. 1 shows a configuration of an image forming system 100. As shown in FIG. 1, the image forming system 100 includes client PCs (Personal Computers) 10 (10a, 10b, etc.), a printer controller 20 as an image processing apparatus, and a printer 30. The client PCs 10 and the printer controller 20 are connected via a communication network N to perform data communications with each other. The printer controller 20 and the printer 30 are connected via a bus for a dedicated interface. In the image forming system 100, the printer controller 20 receives a print job transmitted from the client PC 10a, 10b or the like, and the printer 30 performs print processing (printing/reprinting). The printer controller 20 may be built in the printer 30.

Each client PC 10 includes a CPU (Central Processing Unit), a RAM (Random Access Memory), a storage section such as a hard disk, an operation section, a display section, and a communication section to perform data communications with an external device.

The client PC 10 generates a print job described in PDL (Page Description Language) such as PCL (Printer Control Language) or Postscript® interpretable by the printer controller 20, and transmits the generated print job to the printer controller 20 via the communication network N.

The printer controller 20 receives the print job from the client PC 10, and generates raster data based thereon.

Figure 2:
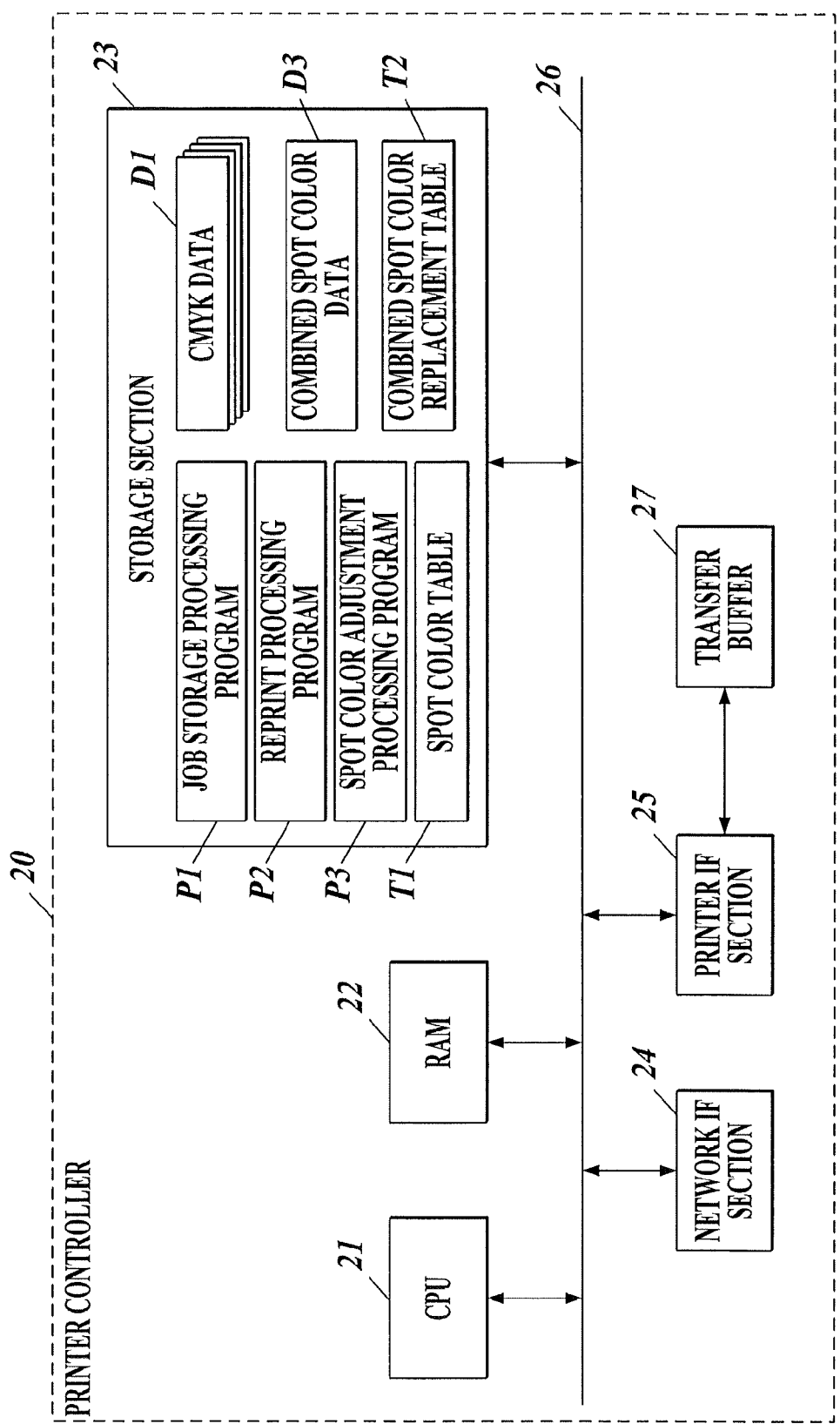
FIG. 2 is a block diagram showing a functional configuration of a printer controller.

FIG. 2 shows a functional configuration of the printer controller 20. As shown in FIG. 2, the printer controller 20 includes a CPU 21, a RAM 22, a storage section 23, a network IF (InterFace) section 24 and a printer IF section 25. These sections and the like are connected via a bus 26.

The CPU 21 controls processing operations of the sections and the like of the printer controller 20 overall. The CPU 21 reads various processing programs stored in the storage section 23 in accordance with instruction signals received by the network IF section 24, and loads the read programs to the RAM 22, so as to perform various types of processing in cooperation with the programs.

The RAM 22 forms a work area where the processing programs executed by the CPU 21 and data for the programs are temporarily stored.

The storage section 23 is constituted of a storage device such as a nonvolatile semiconductor memory or a hard disk, and stores the processing programs, data for the programs and the like therein. For example, the storage section 23 stores a job storage processing program P1, a reprint processing program P2, a spot color adjustment processing program P3 and a spot color table T1 in advance therein. In addition, the storage section 23 stores CMYK data D1, combined spot color data D3 and a combined spot color replacement table T2 therein.

FIG. 3 shows an example of the spot color table T1. In the spot color table T1, spot color names and device color values (CMYK values) corresponding to output colors of the printer 30 (an output device) are respectively correlated with each other, so as to be stored therein. In FIG. 3, a spot color name "Green" is correlated with a CMYK value "100, 0, 100, 0", and a spot color name "Orange" is correlated with a CMYK value "0, 100, 100, 0".

FIG. 4 shows an example of the combined spot color replacement table T2. In the combined spot color replacement table T2, pieces of spot color identification information (IDs, hereinbelow), each representing a spot color or a combination of spot colors (a spot color combination), spot color names, each corresponding to a spot color or a spot color combination, and device color values (CMYK values), each corresponding to a spot color or a spot color combination, are respectively correlated with each other, so as to be stored therein. In FIG. 4, an ID "1" is correlated with a spot color name "Green" and a CMYK value "100, 0, 100, 0". Also, an ID "2" is correlated with a spot color name "Green+Orange" and a CMYK value "100, 100, 100, 0". In addition, an ID "3" is correlated with a spot color name "Orange" and a CMYK value "0, 100, 100, 0".

The network IF section 24 transmits/receives data to/from an external device via the communication network N. For example, the network IF section 24 receives the print job described in PDL such as PostScript from the client PC 10.

The printer IF section 25 transmits/receives data to/from the printer 30. The printer IF section 25 transmits raster data (image data in the bitmap format) to the printer 30. The printer IF section 25 is connected with a transfer buffer 27 where the raster data to be transferred (transmitted) to the printer 30 is temporarily stored.

The CPU 21 analyzes the print job (PDL data), and decompress the print job into C image data, M image data, Y image data and K image data in the bitmap format. The CPU 21 also performs color conversion on the image data in the bitmap format. The CPU 21 may perform color conversion object by object to generate image data in the bitmap format (bitmap data).

Figure 5:
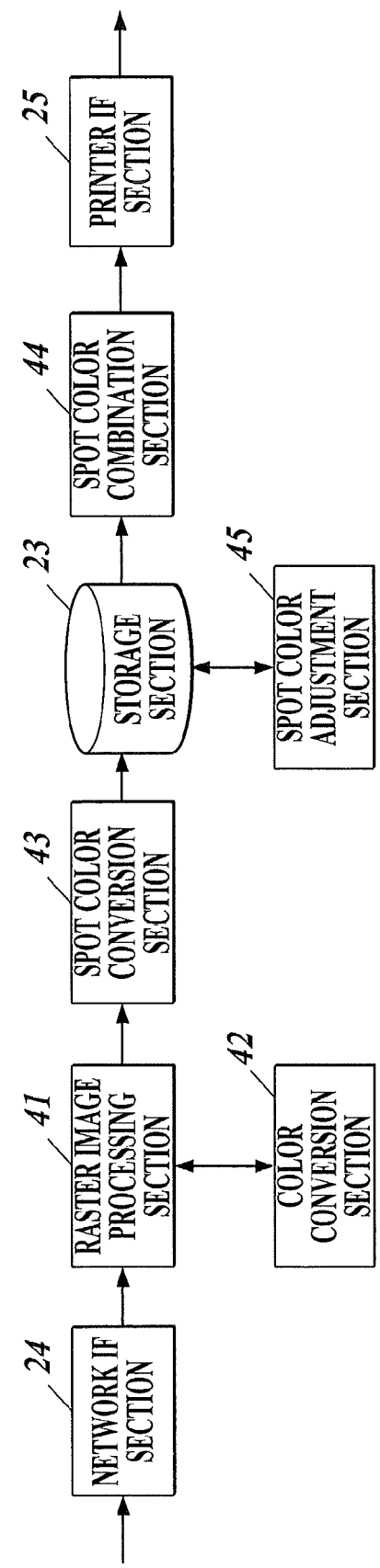
FIG. 5 is a block diagram showing a functional configuration of the printer controller.
Figure 6:
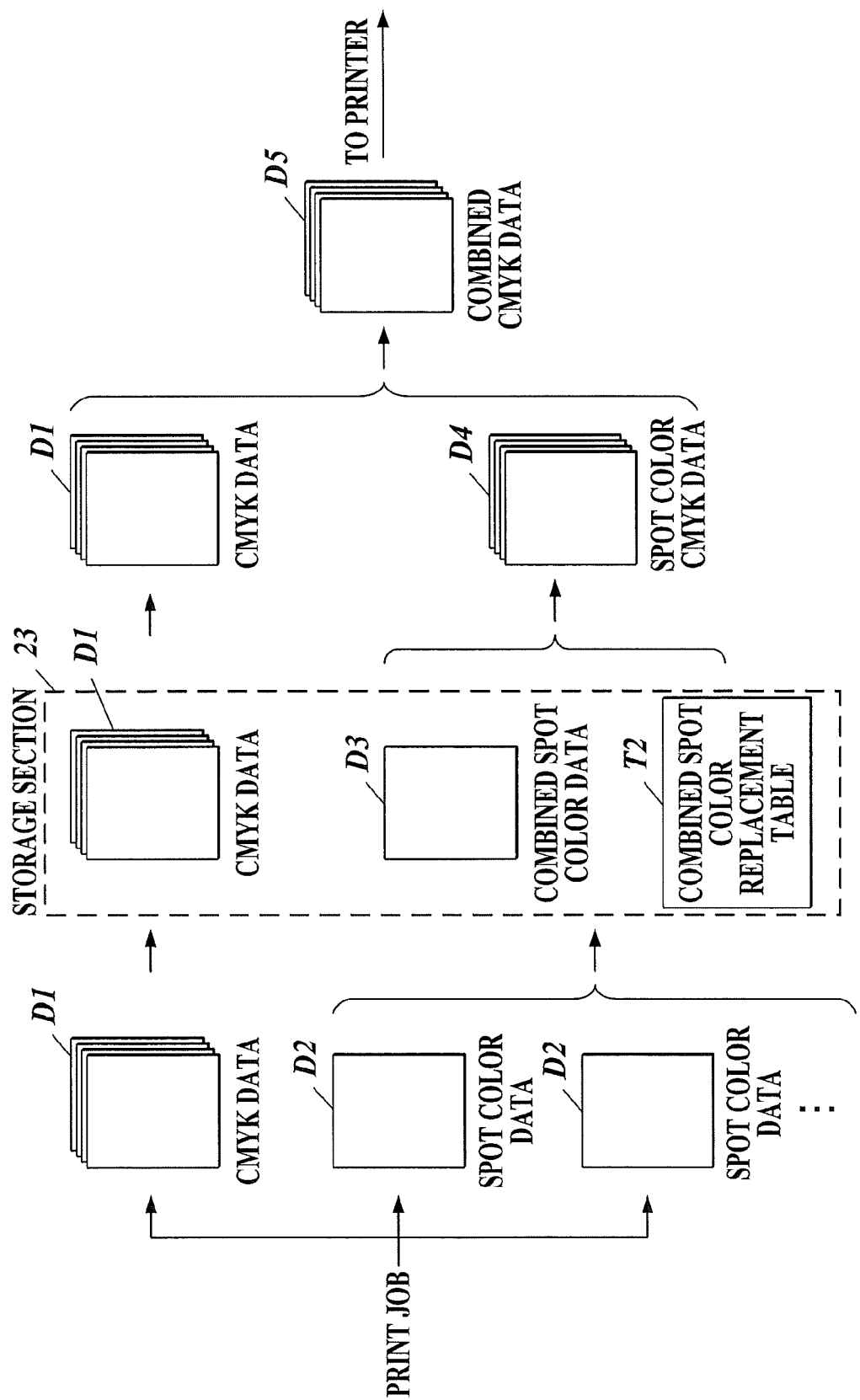
FIG. 6 shows data stream in the printer controller.

With reference to FIGS. 5 and 6, processing performed by the printer controller 20 is described. FIG. 5 is a block diagram showing a functional configuration of the printer controller 20. FIG. 6 shows data stream in the printer controller 20. Functions of an raster image processing section 41, a color conversion section 42 and a spot color conversion section 43 shown in FIG. 5 are realized by software processing of the CPU 21 and the job storage processing program P1 stored in the storage section 23 cooperating with each other. Functions of a spot color combination section 44 are realized by software processing of the CPU 21 and the reprint processing program P2 stored in the storage section 23 cooperating with each other. Functions of a spot color adjustment section 45 are realized by software processing of the CPU 21 and the spot color adjustment processing program P3 stored in the storage section 23 cooperating with each other.

The raster image processing section 41 analyzes the print job received by the network IF section 24, and performs drawing processing, so as to generate image data in the bitmap format. At the time, the color conversion section 42 cooperates with the raster image processing section 41 so as to perform color conversion.

When an object for drawing is not specified by a spot color, namely, is expressed by normal CMYK, the raster image processing section 41 performs the drawing with values obtained by the color conversion performed by the color conversion section 42 based on an ICC profile, so as to generate device color data (CMYK data D1) corresponding to output colors of the printer 30. The CMYK data D1 is constituted of C image data, M image data, Y image data and K image data, and shows gradations of C, M, Y and K with pixel values of pixels of an image. The raster image processing section 41 stores the generated CMYK data D1 in the RAM 22.

On the other hand, when an object for drawing is specified by a spot color, the raster image processing section 41 generates the spot color data D2 of the spot color, without color conversion by the color conversion section 42. The spot color data D2 is image data of a spot color, and shows whether or not the spot color exists at each pixel of an image. For example, pixels to be expressed with a spot color are represented by "1", and the other pixels are represented by "0". The spot color data D2 is generated for the number of spot colors included in a print job. The raster image processing section 41 stores the generated (plurality of) spot color data D2 in the RAM 22.

When re-printing is not performed, the raster image processing section 41 may convert spot colors into CMYK data, and combine the CMYK data with data of colors which are not spot colors.

The spot color conversion section 43 generates the combined spot color data D3 and the combined spot color replacement table T2 from the plurality of spot color data D2.

More specifically, the spot color conversion section 43 calculates device color values (CMYK values), each corresponding to a spot color or a spot color combination, referring to the spot color table T1, so as to generate the combined spot color replacement table T2 in which IDs, each representing a spot color or a spot color combination, are respectively correlated with the calculated CMYK values. Only when a spot color or a spot color combination which is not included in the combined spot color replacement table T2 exists at a pixel of the plurality of spot color data D2, the spot color conversion section 43 adds an ID representing the spot color or the spot color combination to the combined spot color replacement table T2.

The spot color conversion section 43 generates the combined spot color data D3 in which pixels are respectively represented by the IDs, based on the plurality of spot color data D2.

The spot color conversion section 43 stores the combined spot color data D3, the combined spot color replacement table T2, and the CMYK data D1 which is generated by the raster image processing section 41, in the storage section 23. The CMYK data D3 may be stored therein after being compressed.

The spot color combination section 44 generates spot color device color data (spot color CMYK data D4) based on the combined spot color replacement table T2 and the combined spot color data D3 stored in the storage section 23. The spot color CMYK data D4 is constituted of C image data, M image data, Y image data and K image data of an image including a plurality of spot colors.

More specifically, the spot color combination section 44 obtains the device color value (CMYK value) correlated with the ID of each pixel of the combined spot color data D3, referring to the combined spot color replacement table T2, so as to generate the spot color CMYK data D4 based on the obtained CMYK values of the pixels of the combined spot color data D3. Then, the spot color combination section 44 combines the generated spot color CMYK data D4 with the CMYK data D1 stored in the storage section 23, so as to generate combined CMYK data D5. The printer IF section 25 transmits the combined CMYK data D5 to the printer 30, so that the printer 30 performs print processing based thereon.

Job storage processing is defined as processing to receive a print job and accumulate (store) image data. Reprint processing is defined as processing to output the accumulated image data.

When the spot color table T1 stored in the storage section 23 is changed, the spot color adjustment section 45 changes the combined spot color replacement table T2 stored in the storage section 23, based on the changed spot color table T1.

The printer 30 is an MFP having functions to copy, print and scan. It is not necessary for the printer 30 to have the function to scan.

Figure 7:
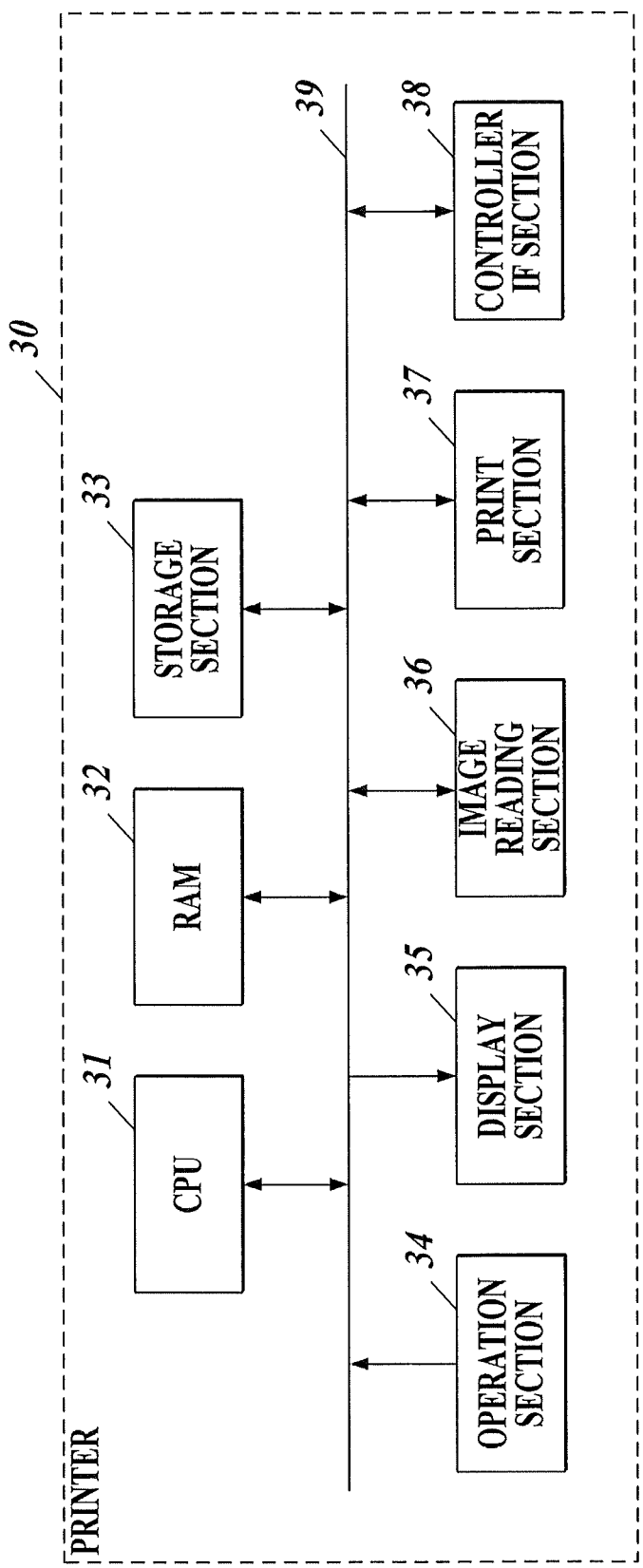
FIG. 7 is a block diagram showing a functional configuration of a printer.

FIG. 7 shows a functional configuration of the printer 30. As shown in FIG. 7, the printer 30 includes a CPU 31, a RAM 32, a storage section 33, an operation section 34, a display section 35, an image reading section 36, a print section 37 and a controller IF section 38. The sections and the like of the printer 30 are connected via a bus 39. The printer 30 is an output device which forms images on paper based on image data in the bitmap format received from the printer controller 20.

The CPU 31 controls processing operations of the sections and the like of the printer 30 overall. The CPU 31 reads various processing programs stored in the storage section 33 in accordance with operation signals inputted from the operation section 34 or instruction signals received by the controller IF section 38, and loads the read programs to the RAM 32, so as to perform various types of processing in cooperation with the programs.

The RAM 32 forms a work area where the processing programs executed by the CPU 31 and data for the programs are temporarily stored.

The storage section 33 is constituted of a storage device such as a nonvolatile semiconductor memory or a hard disk, and stores the processing programs, data for the programs and the like therein. For example, the storage section 33 stores image data received from the printer controller 20 therein.

The operation section 34 includes number input keys, a start key and a touch panel, and receives operation inputs from a user. The operation section 34 outputs operation signals inputted by a user operating the keys or the touch panel to the CPU 31.

The display section 35 includes an LCD (Liquid Crystal Display), and displays various operation screens and various processing results in accordance with instructions from the CPU 31.

The image reading section 36 reads images of a document placed on a document tray or images of a document carried to a predetermined reading point by an ADF (Auto Document Feeder) in accordance with image reading instructions, so as to generate image data.

The print section 37 forms images on paper with the output colors constituted of cyan (C), magenta (M), yellow (Y) and black (K). The print section 37 performs print processing based on image data in the bitmap format (the CMYK data D1 or the combined CMYK data D5) in accordance with print instructions. For example, the print section 37 performs image formation with electrophotography. The print section 37 includes a photosensitive drum, a charging section which charges the photosensitive drum, an exposing section which exposes the surface of the photosensitive drum based on the image data, a developing section which adheres toners to the photosensitive drum, a transferring section which transfers toner images formed on the photosensitive drum to paper and a fixing section which fixes the toner images formed on the paper.

The controller IF section 38 transmits/receives data to/from the printer controller 20. The controller IF section 38 receives image data in the bitmap format from the printer controller 20.

Next, operations of the printer controller 20 are described.

Figure 8:
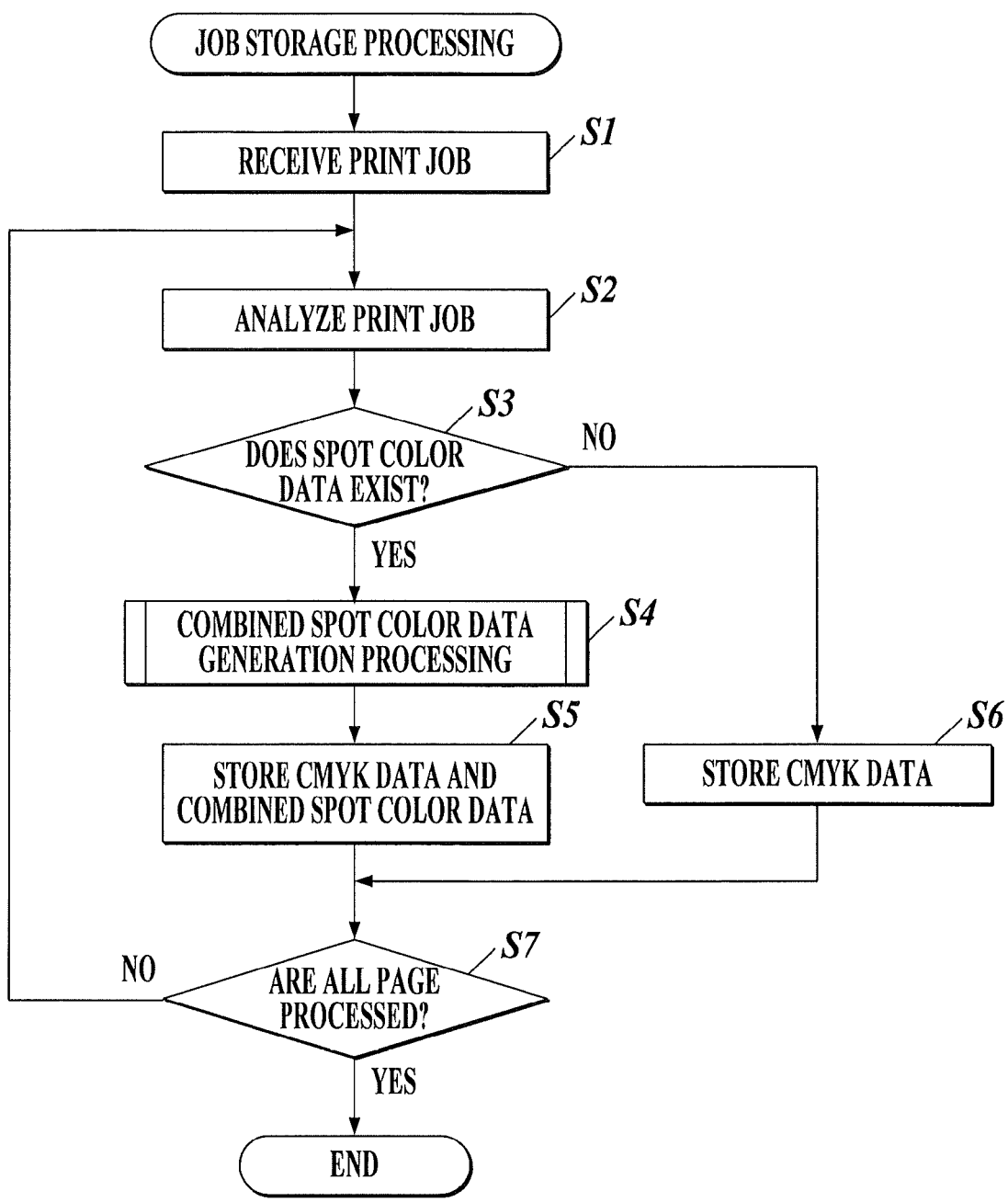
FIG. 8 is a flowchart of job storage processing.

FIG. 8 is a flowchart of the job storage processing performed by the printer controller 20. The job storage processing is realized by software processing of the CPU 21 and the job storage processing program P1 stored in the storage section 23 cooperating with each other.

First, the network IF section 24 receives a print job from the client PC 10a, 10b or the like (Step S1).

Figure 9:
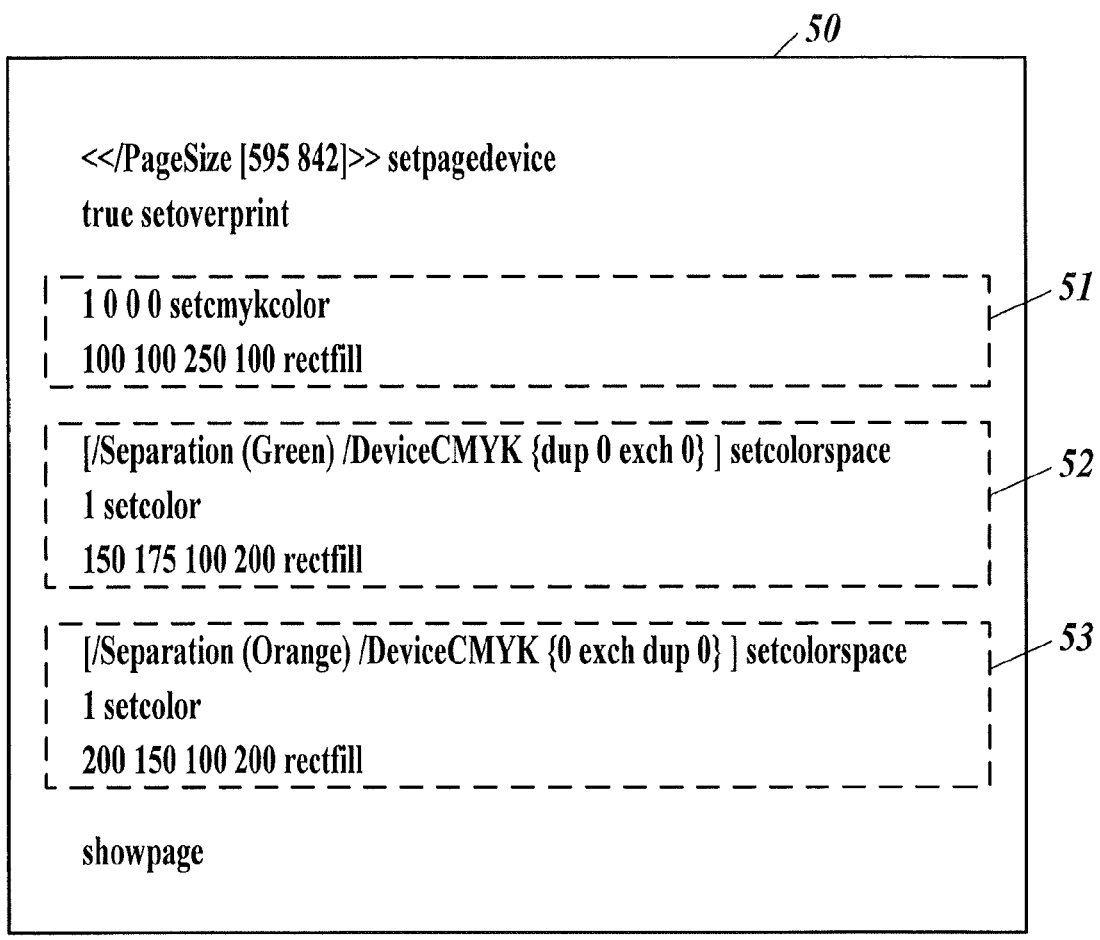
FIG. 9 shows an example of a print job including spot colors.
Figure 10:
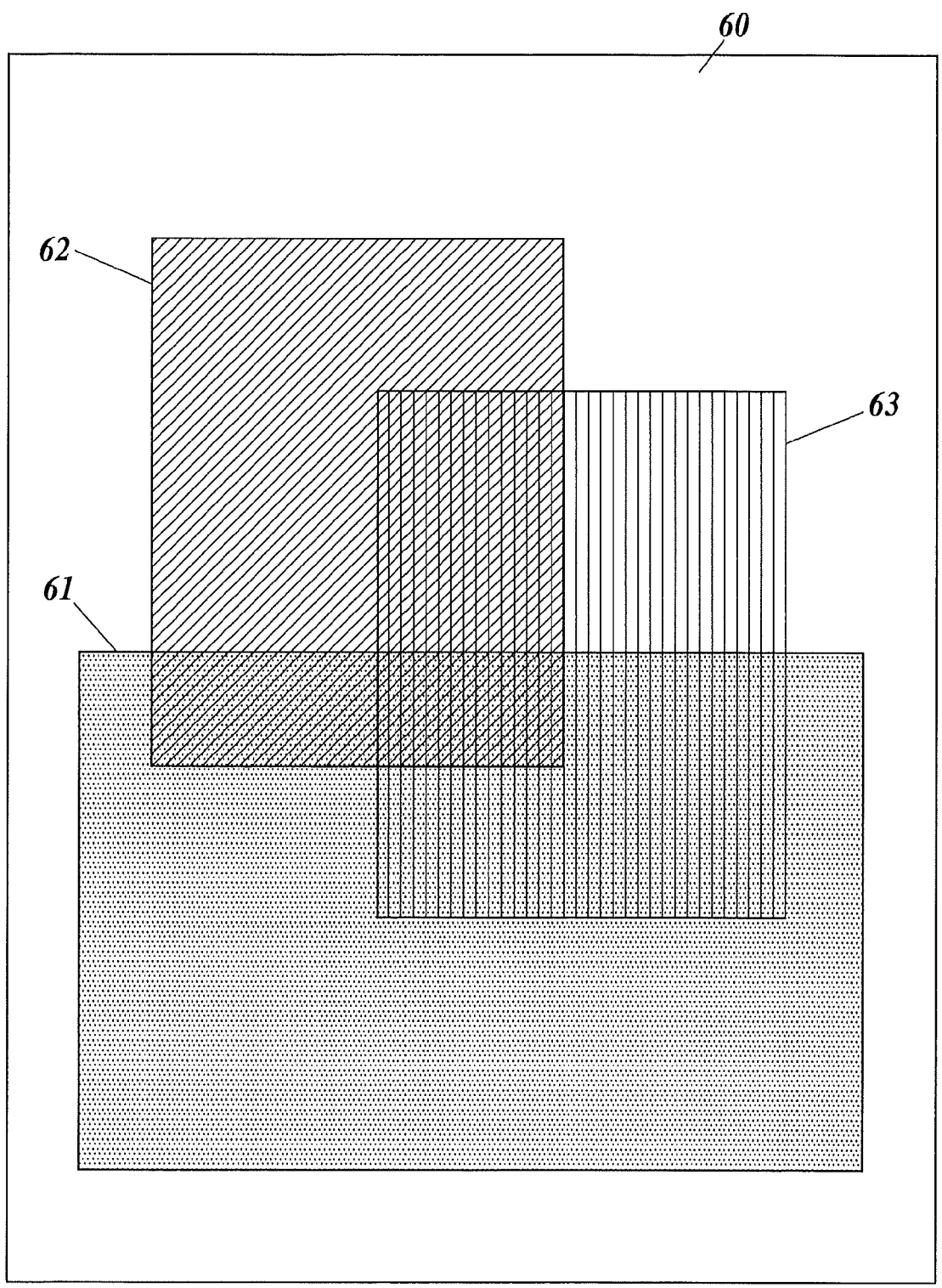
FIG. 10 shows an output result of printing performed based on the print job.

FIG. 9 shows an example of a print job (PostScript) 50 including spot colors. The print job 50 includes a CMYK object 51, a spot color object 52 having a spot color name "Green", and a spot color object 53 having a spot color name "Orange". When printing is performed based on the print job 50, as shown in FIG. 10, an image including a CMYK object 61, a green spot color object 62, and an orange spot color object 63 is printed on paper 60.

Next, the raster image processing section 41 analyzes the received print job, so as to generate image data (Step S2). More specifically, when an object expressed with normal CMYK is included in a print job, the color conversion section 42 performs color conversion based on an ICC profile, and the raster image processing section 41 performs drawing with values obtained by the color conversion, so as to generate the CMYK data D1. When spot colors are specified (included) in a print job, the raster image processing section 41 generates the spot color data D2 for the number of spot colors included in the print job.

Next, the spot color conversion section 43 judges whether or not the spot color data D2 (a plurality of spot color data D2) generated from the print job exists (Step S3). When judging that the spot color data D2 generated from the print job exists (Step S3; YES), the spot color conversion section 43 performs combined spot color data generation processing (Step S4).

Figure 11:
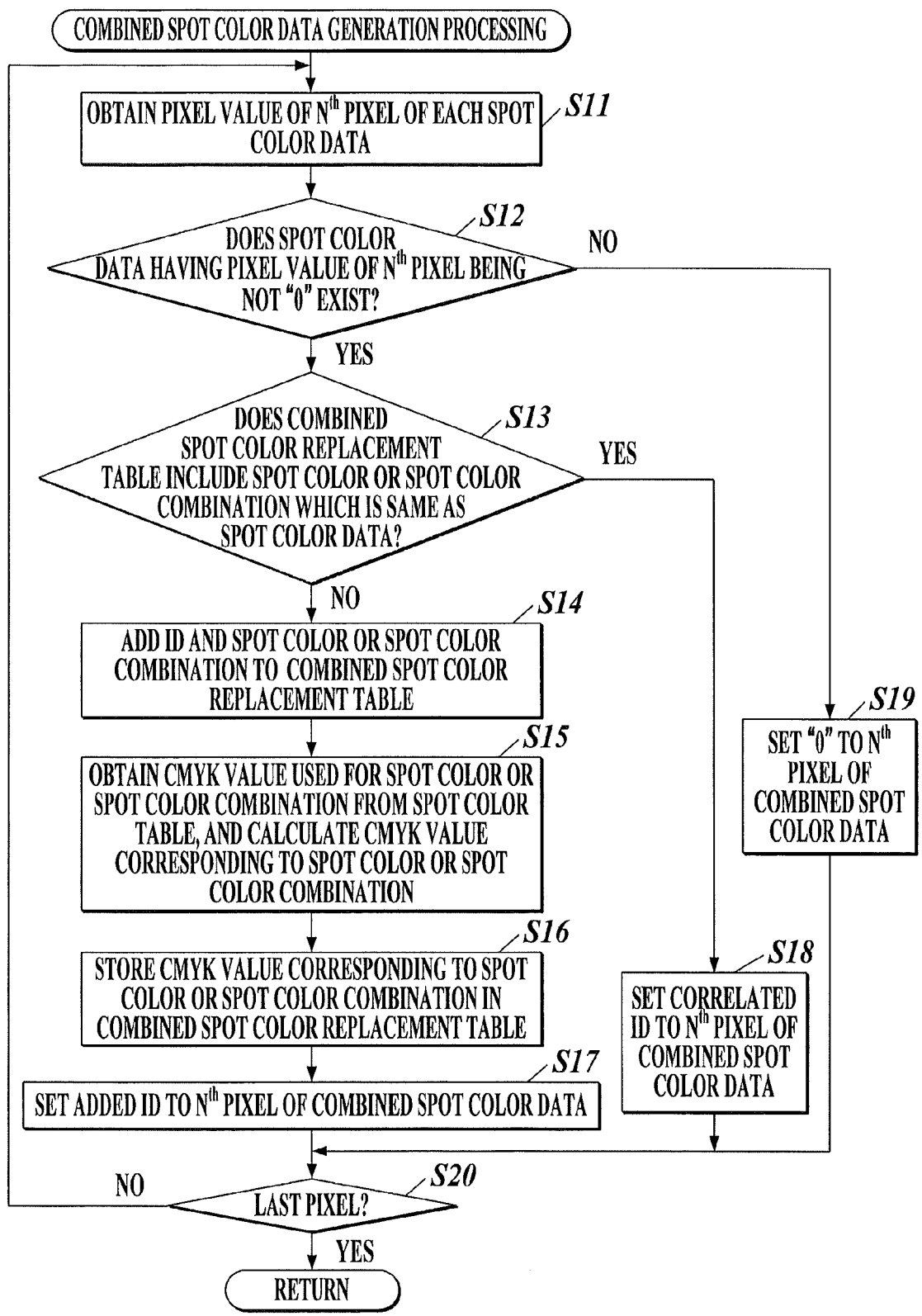
FIG. 11 is a flowchart of combined spot color data generation processing.

With reference to FIG. 11, the combined spot color data generation processing is described.

The spot color conversion section 43 obtains a pixel value of an $n^{th}$ pixel of each spot color data D2 (Step S11). Then, the spot color conversion section 43 judges whether or not, among the plurality of spot color data D2, spot color data D2 having the obtained pixel value of the $n^{th}$ pixel being not "0" exists (Step S12).

When judging that at least one spot color data D2 having the obtained pixel value of the $n^{th}$ pixel being not "0" exists (Step S12; YES), the spot color conversion section 43 judges whether or not the combined spot color replacement table T2 stored in the storage section 23 includes a spot color or a spot color combination which is the same as the spot color of the spot color combination shown by the spot color data D2 having the obtained pixel value of the $n^{th}$ pixel being not "0" (Step S13).

When judging that the combined spot color replacement table T2 does not include a spot color or a spot color combination which is the same as the spot color or the spot color combination shown by the spot color data D2 having the obtained pixel value of the $n^{th}$ pixel being not "0" (Step S13; NO), the spot color conversion section 43 gives an ID to the spot color or the spot color combination corresponding to (shown by) the spot color data D2 having the obtained pixel value of the $n^{th}$ pixel being not "0", and adds the ID and the spot color or the spot color combination (a spot color name) to the combined spot color replacement table T2 stored in the storage section 23 (Step S14).

Next, the spot color conversion section 43 obtains the CMYK value (or CMYK values) used for the added spot color or spot color combination from the spot color table T1, and calculates a CMYK value corresponding to the added spot color or spot color combination therefrom (Step S15). Then, the spot color conversion section 43 stores the CMYK value corresponding to the added spot color or spot color combination in the combined spot color replacement table T2 stored in the storage section 23 (Step S16).

Next, the spot color conversion section 43 sets the ID added at Step S14 to the $n^{th}$ pixel of the combined spot color data D3 (Step S17).

At Step S13, when judging that the combined spot color replacement table T2 includes a spot color or a spot color combination which is the same as the spot color or the spot color combination shown by the spot color data D2 having the obtained pixel value of the $n^{th}$ pixel being not "0" (Step S13; YES), the spot color conversion section 43 sets the ID correlated with the spot color or the spot color combination in the combined spot color replacement table T2 to the $n^{th}$ pixel of the combined spot color data D3 (Step S18).

At Step S12, when judging that the spot color data D2 having the obtained pixel value of the $n^{th}$ pixel being not "0" does not exist (Step S12; NO), namely, judging that the $n^{th}$ pixel of each of all the spot color data D2 is "0", the spot color conversion section 43 sets "0" to the $n^{th}$ pixel of the combined spot color data D3 (Step S19).

Figure 12A:
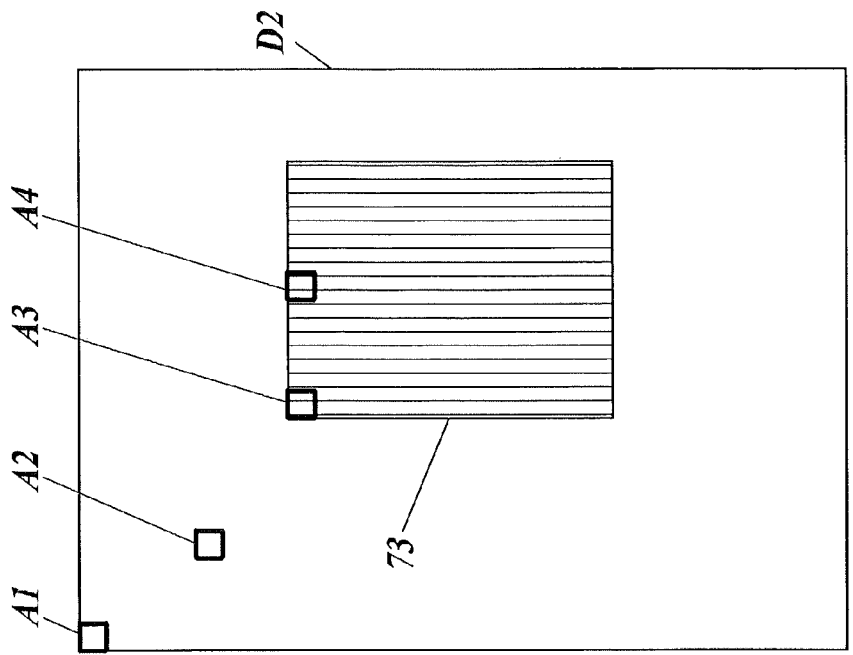
FIG. 12A shows an example of spot color data of green.
Figure 12B:
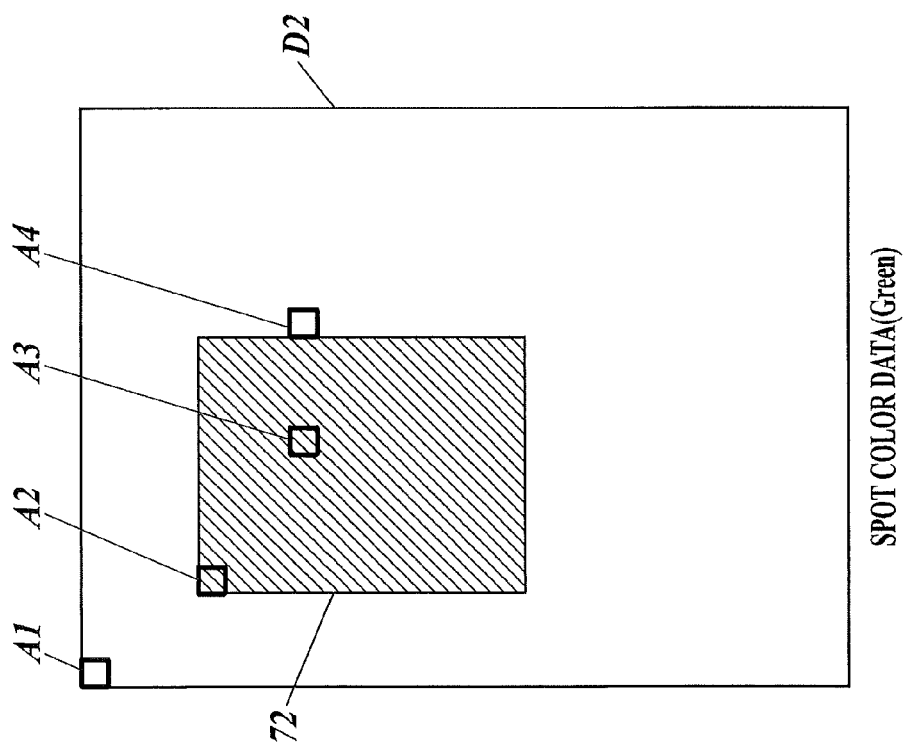
FIG. 12B shows an example of spot color data of orange.
Figure 13:
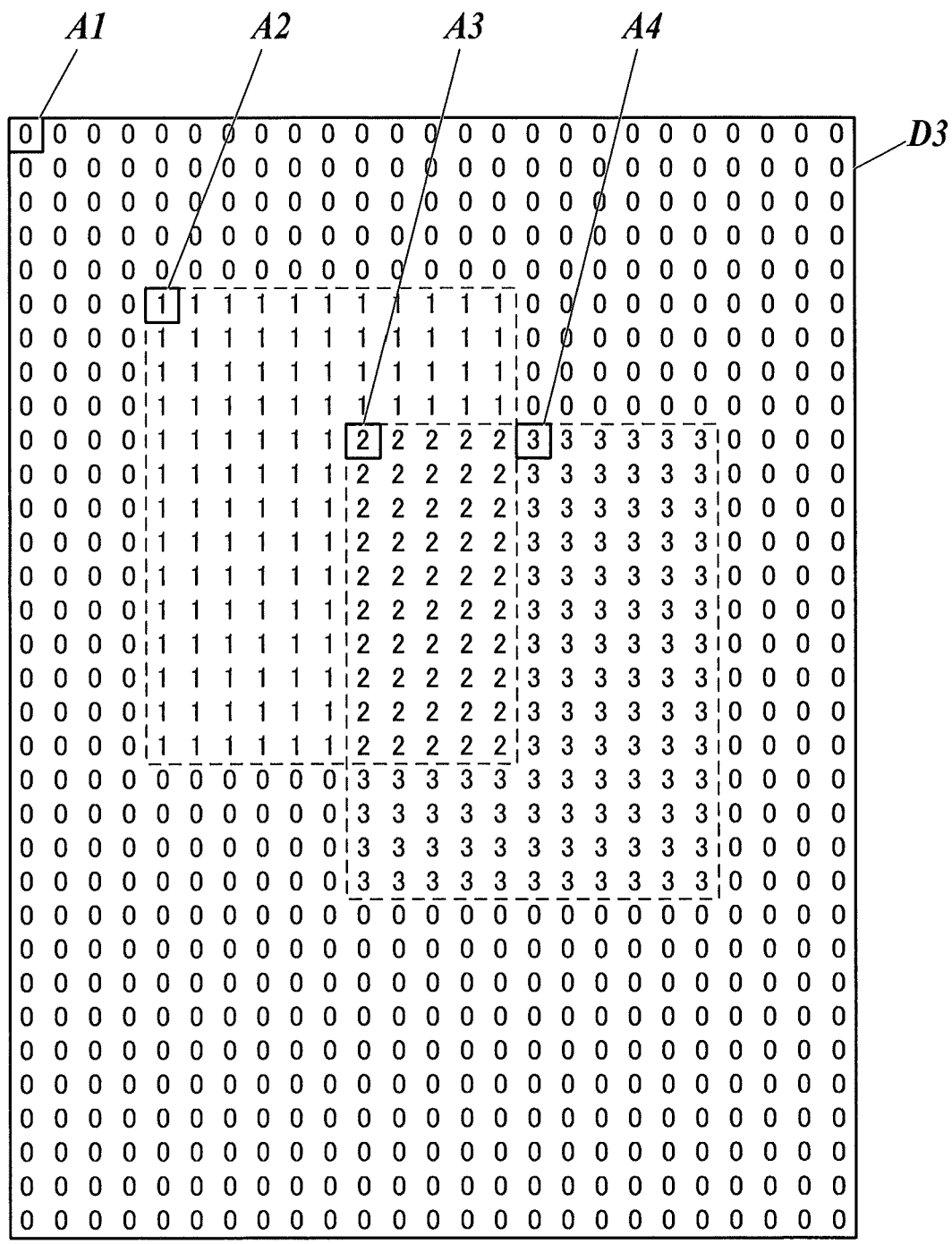
FIG. 13 shows an example of combined spot color data generated from two spot color data.

FIG. 12A shows an example of green spot color data D2. FIG. 12B shows an example of orange spot color data D2. A green spot color object 72 in the green spot color data D2 and an orange spot color object 73 in the orange spot color data D2 respectively correspond to the green spot color object 62 and the orange spot color object 63 shown in FIG. 10. FIG. 13 shows the combined spot color data D3 generated from the two spot color data D2 shown in FIGS. 12A and 12B.

The spot color conversion section 43 checks whether or not a spot color is included in each pixel of the green spot color data D2 and the orange spot color data D2.

As shown in FIGS. 12A and 12B, no object exists at a pixel A1 of the green spot color data D2 or the orange spot color data D2. Hence, as shown in FIG. 13, "0" is set to the pixel A1 of the combined spot color data D3.

As shown in FIGS. 12A and 12B, only the green spot color object 72 exists at a pixel A2. Hence, an ID "1" representing green and a spot color name "Green" are added to the combined spot color replacement table T2. Then, the CMYK value correlated with the spot color name "Green" is obtained from the spot color table T1, and the obtained CMYK value is stored in the combined spot color replacement table T2. As shown in FIG. 13, "1" is set to the pixel A2 of the combined spot color data D3. If the combined spot color replacement table T2 already has data for green, it is not necessary to add the data for green to the combined spot color replacement table T2.

As shown in FIGS. 12A and 12B, both the green spot color object 72 and the orange spot color object 73 exist at a pixel A3. Hence, an ID "2" representing green plus orange and a spot color name "Green+Orange" are added to the combined spot color replacement table T2. Then, the CMYK value correlated with the spot color name "Green" and the CMYK value correlated with the spot color name "Orange" are obtained from the spot color table T1, and a CMYK value corresponding to the spot color name "Green+Orange" is calculated based on the obtained CMYK values. Then, the calculated CMYK value is stored in the combined spot color replacement table T2. More specifically, a C value, an M value, a Y value and a K value (a CMYK value) correlated with the spot color name "Green" in the spot color table T1 are respectively added to a C value, an M value, a Y value and a K value (a CMYK value) correlated with the spot color name "Orange" in the spot color table T1. Note that, when each summed value exceeds the maximum value (100, for example), the summed value is made to be equal to the maximum value. As shown in FIG. 13, "2" is set to the pixel A3 of the combined spot color data D3. If the combined spot color replacement table T2 already has data for green plus orange, it is not necessary to add the data for green plus orange to the combined spot color replacement table T2.

As shown in FIGS. 12A and 12B, only the orange spot color object 73 exists at a pixel A4. Hence, an ID "3" representing orange and a spot color name "Orange" are added to the combined spot color replacement table T2. Then, the CMYK value correlated with the spot color name "Orange" is obtained from the spot color table T1, and the obtained CMYK value is stored in the combined spot color replacement table T2. As shown in FIG. 13, "3" is set to the pixel A4 of the combined spot color data D3. If the combined spot color replacement table T2 already has data for orange, it is not necessary to add the data for orange to the combined spot color replacement table T2.

After Step S17, Step S18 or Step S19, the CPU 21 judges whether or not the processed pixel is the last pixel (Step S20). When judging that the processed pixel is not the last pixel (Step S20; NO), the CPU 21 moves the processing to Step S11, so as to repeat the processing.

At Step S20, when judging that the processed pixel is the last pixel (Step S20; YES), the spot color conversion section 43 stores the CMYK data D1 and the combined spot color data D3 in the storage section 23 (Step S5 in FIG. 8).

At Step S3, when judging that the spot color data D2 generated from the print job does not exist (Step S3; NO), the spot color conversion section 43 stores only the CMYK data D1 in the storage section 23 (Step S6).

After Step S5 or Step S6, the CPU 21 judges whether or not the processing is performed with respect to all pages identified by the print job (Step S7). When judging that there is a page with respect to which the processing is not performed yet (Step S7; NO), the CPU 21 moves the processing to Step S2, so as to repeat the processing.

When judging that the processing is performed with respect to all pages (Step S7; YES), the CPU 21 ends the job storage processing.

Figure 14:
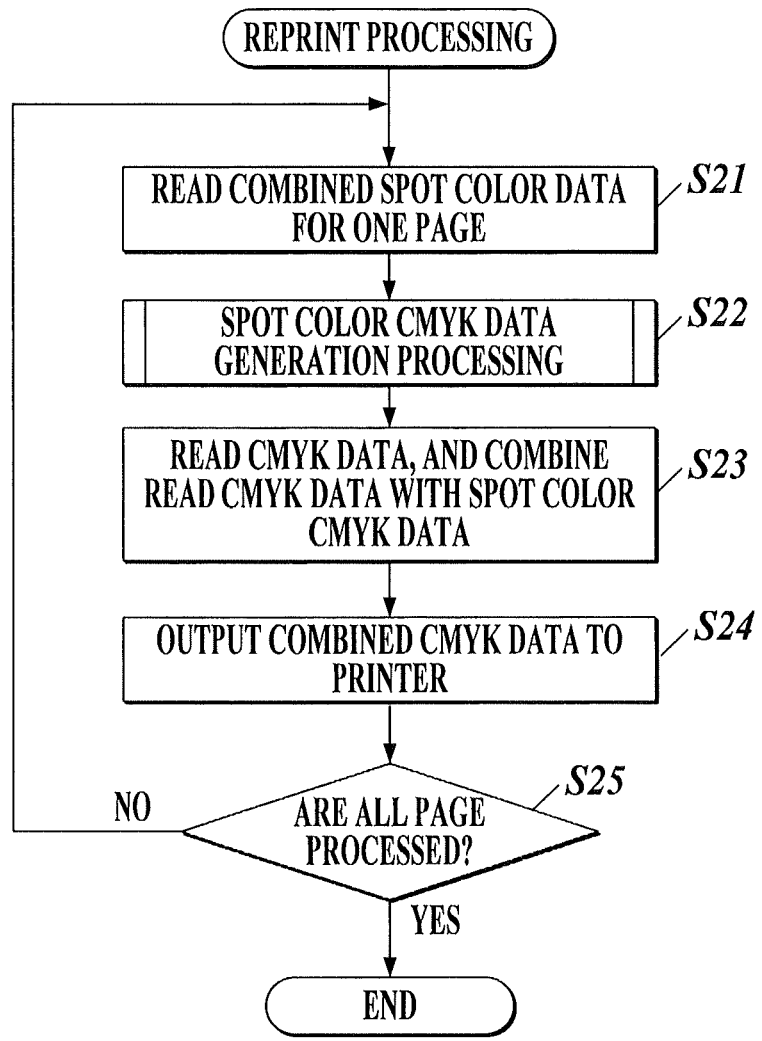
FIG. 14 is a flowchart of reprint processing.

FIG. 14 shows a flowchart of the reprint processing performed by the printer controller 20. The reprint processing is realized by software processing of the CPU 21 and the reprint processing program P2 stored in the storage section 23 cooperating with each other.

First, the spot color combination section 44 reads the combined spot color data D3 for one page from the storage section 23 (Step S21).

Next, the spot color combination section 44 performs spot color CMYK data generation processing (Step S22).

Figure 15:
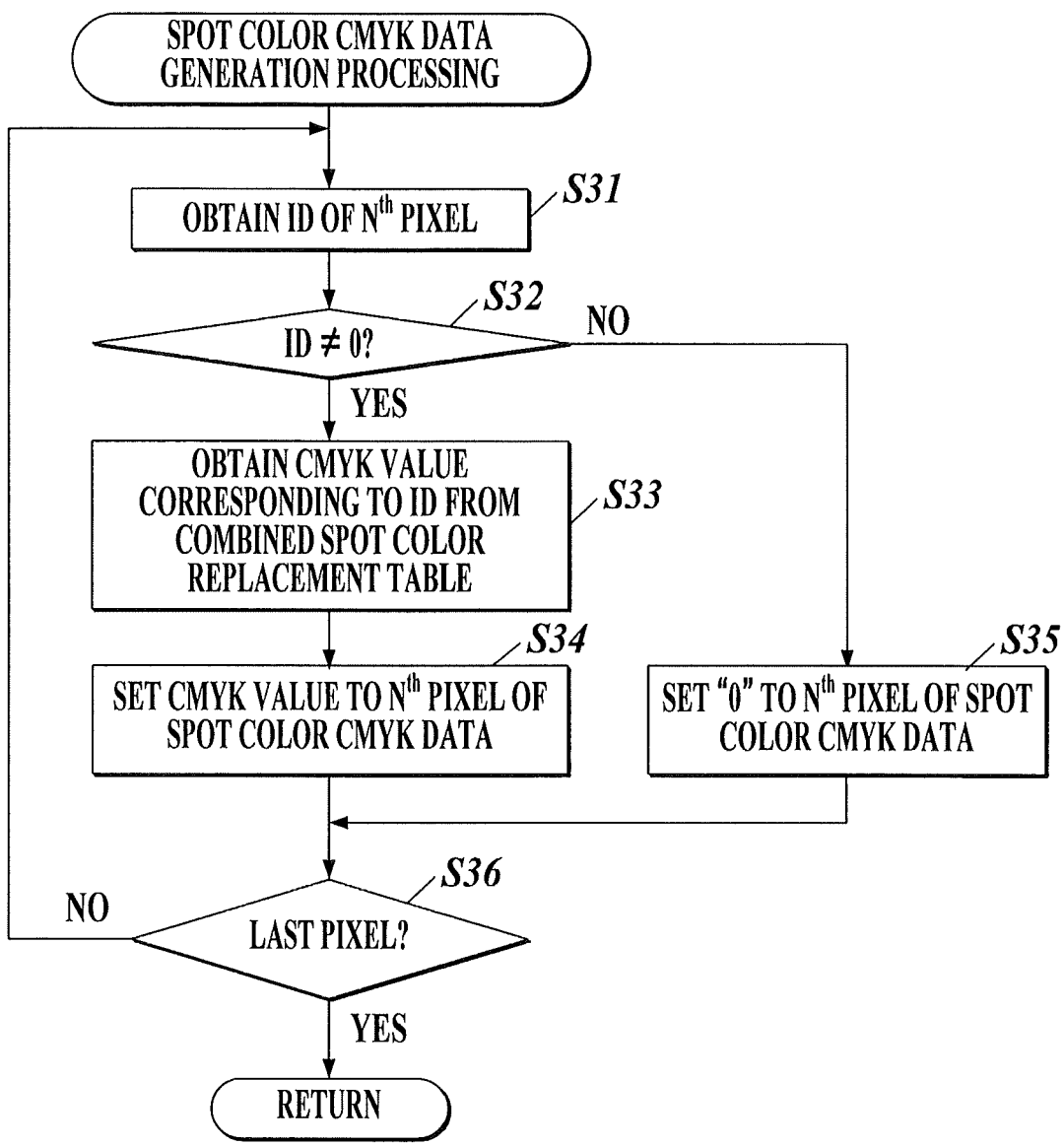
FIG. 15 is a flowchart of spot color CMYK data generation processing.

With reference to FIG. 15, the spot color CMYK data generation processing is described.

The spot color combination section 44 obtains the ID of the $n^{th}$ pixel of the page of the combined spot color data D3, the page which is read at Step S21 (Step S31), and judges whether or not the ID of the $n^{th}$ pixel is other than "0" (Step S32).

When judging that the ID of the $n^{th}$ pixel is other than "0" (Step S32; YES), the spot color combination section 44 obtains the CMYK value correlated with the ID of the $n^{th}$ pixel, referring to the combined spot color replacement table T2 stored in the storage section 23 (Step S33). Then, the spot color combination section 44 sets the obtained CMYK value to the $n^{th}$ pixel of the spot color CMYK data D4 (Step S34). More specifically, the spot color combination section 44 sets the obtained C value to the $n^{th}$ pixel of C image data of the spot color CMYK data D4, the obtained M value to the $n^{th}$ pixel of M image data thereof, the obtained Y value to the $n^{th}$ pixel of Y image data thereof, and the obtained K value to the $n^{th}$ pixel of K image data thereof.

When judging that the ID of the $n^{th}$ pixel is "0" (Step S32; NO), the spot color combination section 44 sets "0" to the $n^{th}$ pixel of the spot color CMYK data D4 (Step S35). More specifically, the spot color combination section 44 sets "0" to the $n^{th}$ pixel of each of the C image data, the M image data, the Y image data and the K image data of the spot color CMYK data D4.

After Step S34 or Step S35, the CPU 21 judges whether or not the processed pixel is the last pixel (Step S36). When judging that the processed pixel is not the last pixel (Step S36; NO), the CPU 21 moves the processing to Step S31, so as to repeat the processing.

When judging that the processed pixel is the last pixel (Step S36; YES), the spot color combination section 44 reads the CMYK data D1 stored in the storage section 23, and combines the CMYK data D1 with the spot color CMYK data D4 generated by the spot color CMYK data generation processing (combining processing) (Step S23 in FIG. 14). In the combining processing, addition processing is performed for each color (cyan to cyan, magenta to magenta, or the like). When the result of the addition processing (summed value) for each color exceeds the maximum value (100, for example), the result thereof is made to be equal to the maximum value.

Figure 16A:
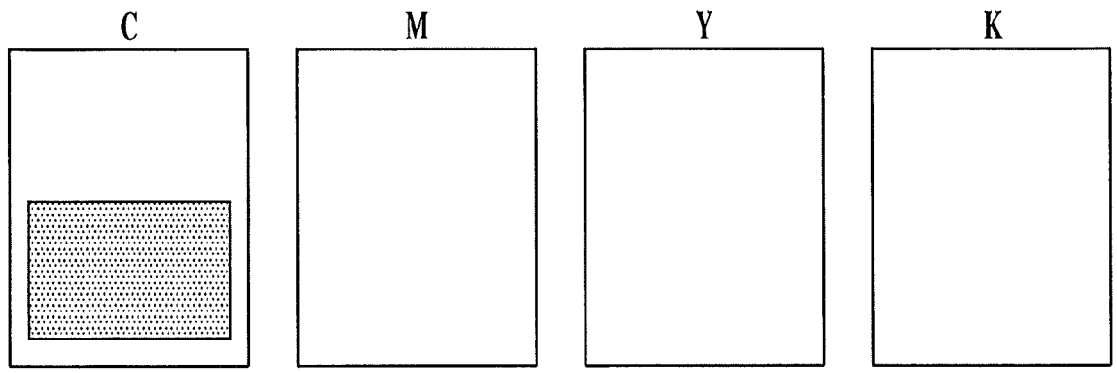
FIG. 16A shows an example of CMYK data.
Figure 16B:
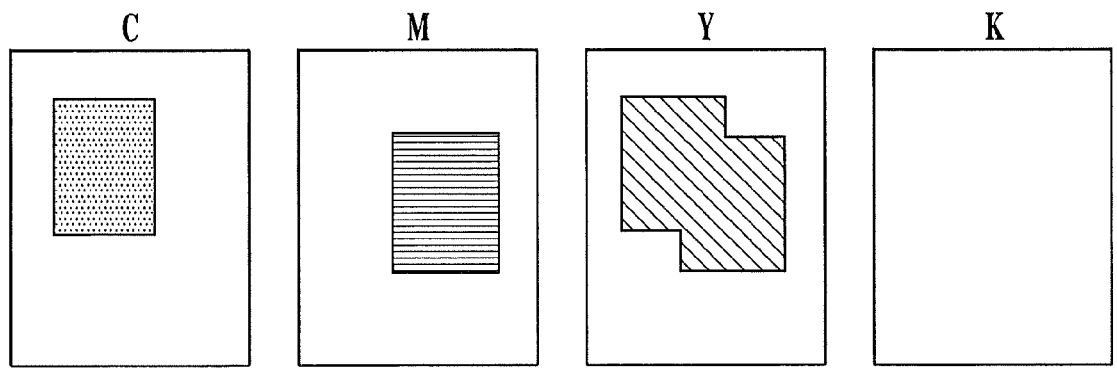
FIG. 16B shows an example of spot color CMYK data.
Figure 16C:
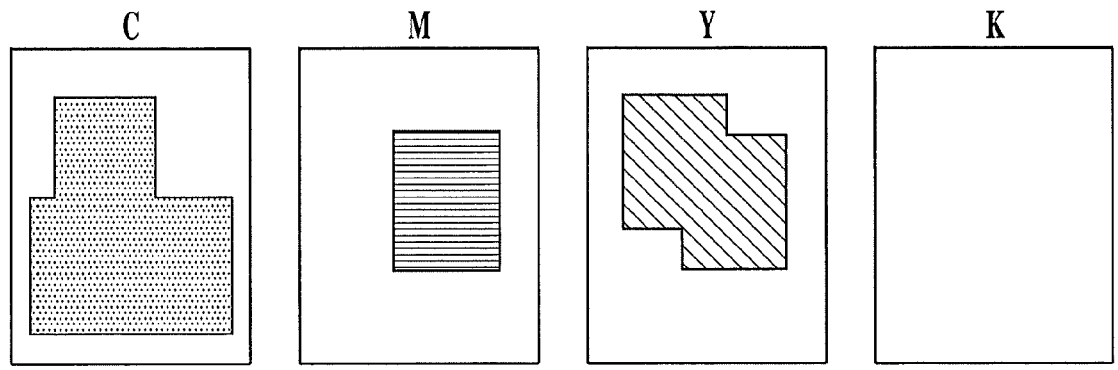
FIG. 16C shows an example of combined CMYK data.

FIG. 16A shows an example of the CMYK data D1. FIG. 16B shows an example of the spot color CMYK data D4. FIG.

16C shows the combined CMYK data D5 obtained by combining the CMYK data D1 with the spot color CMYK data D4.

The printer IF section 25 outputs the combined CMYK data D5 to the printer 30 (Step S24). The printer 30 performs print processing based on the combined CMYK data D5.

Next, the CPU 21 judges whether or not the processing is performed with respect to all pages identified by the print job (Step S25). When judging that there is a page with respect to which the processing is not performed yet (Step S25; NO), the CPU 21 moves the processing to Step S21, so as to repeat the processing.

When judging that the processing is performed with respect to all pages (Step S25; YES), the CPU 21 ends the reprint processing. In the embodiment, the reprint processing is performed page by page. However, the reprint processing may be performed band by band.

Figure 17:
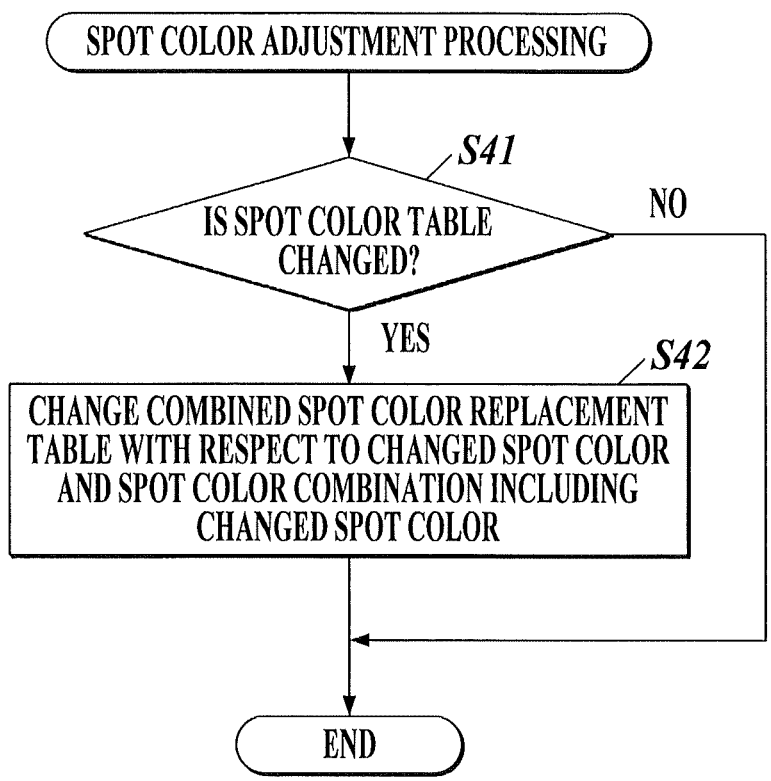
FIG. 17 is a flowchart of spot color adjustment processing.

FIG. 17 shows a flowchart of spot color adjustment processing performed by the printer controller 20. The spot color adjustment processing is realized by software processing of the CPU 21 and the spot color adjustment processing program P3 stored in the storage section 23 cooperating with each other.

First, the spot color adjustment section 45 judges whether or not the spot color table T1 stored in the storage section 23 is changed (Step S41).

In the image forming system 100, after printing is performed based on a print job including spot colors, a user visually confirms colors of a printed image. When at least one color (spot color) of the printed image is not right, namely, the color does not match a color of its original image, the spot color table T1 is corrected for color matching, so as to adjust the color for the spot color. For example, a change instruction to change the spot color table T1 is inputted from the operation section of the client PC 10a, 10b or the like, and transmitted to the printer controller 20 via the communication network N.

When the network IF section 24 receives the change instruction to change the spot color table T1 from the client PC 10a, 10b or the like, the spot color adjustment section 45 changes, based on the change instruction, the CMYK value correlated with the spot color name, which is to be changed according to the change instruction, in the spot color table T1.

When judging that the spot color table T1 is changed (Step S41; YES), the spot color adjustment section 45 changes the combined spot color replacement table T2 stored in the storage section 23, with respect to the changed spot color and the spot color combination including the changed spot color (Step S42).

FIG. 18 shows the corrected (changed) spot color table T1 which is obtained by performing correction with respect to the spot color name "Green" in the spot color table T1 shown in FIG. 3. In the corrected spot color table T1, the CMYK value for the spot color name "Green" is changed to "90, 0, 100, 10".

In accordance with the change of the spot color table T1, the spot color adjustment section 45 changes the CMYK value for the spot color, namely green, and the CMYK value for the spot color combination including green in the combined spot color replacement table T2. FIG. 19 shows the corrected combined spot color replacement table T2 which is obtained by performing correction on the combined spot color replacement table T2 shown in FIG. 4. In the corrected combined spot color replacement table T2, the CMYK value for the spot color name "Green" is changed to "90, 0, 100, 10", and the CMYK value for the spot color name "Green+Orange" is changed to "90, 100, 100, 10".

When judging that the spot color table T1 is not changed (Step S41; NO), or after Step S42, the CPU 21 ends the spot color adjustment processing.

When the reprint processing is performed after the spot color adjustment processing, the corrected combined spot color replacement table T2 is used therefor.

As described above, according to the printer controller in the embodiment, the combined spot color data D3 generated from a plurality of spot color data D2 is stored. Accordingly, as compared with a case where a plurality of spot color data D2 is stored as it is, the amount of data stored when image data including spot colors is stored can be reduced.

Furthermore, in the case where a plurality of spot color data D2 is stored as it is, conventionally, it is necessary that CMYK data for each spot color is generated from the plurality of spot color data D2, and the generated CMYK data for each spot color is combined with the CMYK data D1 when the reprint processing is performed. However, according to the printer controller 20 in the embodiment, the spot color CMYK data D4 is generated based on the combined spot color data D3 and the combined spot color replacement table T2. Accordingly, as compared with the case where a plurality of spot color data D2 is stored as it is, processing can be sped up.

Furthermore, spot colors can be adjusted only by changing the combined spot color replacement table T2 in accordance with the change of the spot color table T1. Accordingly, it becomes unnecessary to perform the raster image processing again, unlike conventional ways. Furthermore, when spot colors are adjusted, what is necessary is only changing data stored in the storage section 23. Consequently, the raster image processing for another print job is not interrupted. Accordingly, productivity of the system can be increased.

Furthermore, unnecessary processing can be omitted by adding, among the spot colors and spot color combinations, only necessary spot colors and/or spot color combinations to the combined spot color replacement table T2.

The embodiment described above is an example of the image processing apparatus of the present invention. Hence, the present invention is not limited thereto. In addition, the detailed configurations and operations of the sections and the like of the image processing apparatus can be appropriately modified without departing from the scope of the present invention.

Furthermore, in the embodiment, as a computer readable medium storing the programs to perform the above-mentioned processing, a semiconductor memory or a hard disk is used. However, this is not a limit. Other than these, a potable recording medium such as a CD-ROM can be used as the computer readable medium. Furthermore, as a medium to provide data of the programs via a communication line, a carrier wave can be used.

According to a first aspect of the embodiment of the present invention, there is provided an image processing apparatus which processes image data including: first data corresponding to an output color of an output device; and a plurality of second data of respective spot colors, the image processing apparatus including: a conversion section which (i) calculates a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generates, based on the plurality of second data, third data in which each pixel is represented by the spot color identification information; and a storage section which stores the first data, the second table and the third data.

According to the image processing apparatus, the third data is generated from the plurality of second data. Accordingly, as compared with a case where a plurality of second data is stored as it is, the amount of data stored when image data including spot colors is stored can be reduced.

Preferably, the image processing apparatus further includes: a combination section which (i) obtains, for each pixel of the third data, the device color value correlated with the spot color identification information, referring to the second table, so as to generate fourth data based on the obtained device color value, and (ii) combines the generated fourth data with the first data.

According to the image processing apparatus, the fourth data is generated based on the third data and the second table. Accordingly, as compared with the case where a plurality of second data is stored as it is, processing can be sped up.

Preferably, the image processing apparatus further includes: an adjustment section which, when the first table is changed, changes the second table stored in the storage section based on the changed first table.

According to the image processing apparatus, spot colors can be adjusted only by changing the second table in accordance with the change of the first table.

Preferably, in the image processing apparatus, when the spot color or the spot color combination not included in the second table exists at a pixel of the plurality of second data, the conversion section adds the spot color identification information on the spot color or the spot color combination to the second table.

According to the image processing apparatus, unnecessary processing can be omitted by adding, among the spot colors in the first table and spot color combinations obtainable from the first table, only necessary spot colors and/or spot color combinations to the second table.

According to a second aspect of the embodiment of the present invention, there is provided an image processing method for processing image data including: first data corresponding to an output color of an output device; and a plurality of second data of respective spot colors, the image processing method including: a conversion step of (i) calculating a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generating, based on the plurality of second data, third data in which each pixel is represented by the spot color identification information; and a storage step of storing the first data, the second table and the third data.

According to the image processing method, the third data is generated from the plurality of second data. Accordingly, as compared with a case where a plurality of second data is stored as it is, the amount of data stored when image data including spot colors is stored can be reduced.

Preferably, the image processing method further includes: a combination step of (i) obtaining, for each pixel of the third data, the device color value correlated with the spot color identification information, referring to the second table, so as to generate fourth data based on the obtained device color value, and (ii) combining the generated fourth data with the first data.

According to the image processing method, the fourth data is generated based on the third data and the second table. Accordingly, as compared with the case where a plurality of second data is stored as it is, processing can be sped up.

Preferably, the image processing method further includes: an adjustment step of, when the first table is changed, changing the second table stored in the storage section based on the changed first table.

According to the image processing method, spot colors can be adjusted only by changing the second table in accordance with the change of the first table.

Preferably, in the image processing method, when the spot color or the spot color combination not included in the second table exists at a pixel of the plurality of second data, the spot color identification information on the spot color or the spot color combination is added to the second table in the conversion step.

According to the image processing method, unnecessary processing can be omitted by adding, among the spot colors shown in the first table and spot color combinations obtainable from the first table, only necessary spot colors and/or spot color combinations to the second table.

According to a third aspect of the embodiment of the present invention, there is provided a computer readable recording medium storing a program making a computer, which processes image data including: first data corresponding to an output color of an output device; and a plurality of second data of respective spot colors, function as: a conversion section which (i) calculates a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generates, based on the plurality of second data, third data showing in which each pixel is represented by the spot color identification information; and a storage section which stores the first data, the second table and the third data.

According to the recording medium, the third data is generated from the plurality of second data. Accordingly, as compared with a case where a plurality of second data is stored as it is, the amount of data stored when image data including spot colors is stored can be reduced.

Preferably, in the computer readable recording medium, the program makes the computer further function as: a combination section which (i) obtains, for each pixel of the third data, the device color value correlated with the spot color identification information, referring to the second table, so as to generate fourth data based on the obtained device color value, and (ii) combines the generated fourth data with the first data.

According to the recording medium, the fourth data is generated based on the third data and the second table. Accordingly, as compared with the case where a plurality of second data is stored as it is, processing can be sped up.

Preferably, in the computer readable recording medium, the program makes the computer further function as: an adjustment section which, when the first table is changed, changes the second table stored in the storage section based on the changed first table.

According to the recording medium, spot colors can be adjusted only by changing the second table in accordance with the change of the first table.

Preferably, in the computer readable recording medium, when the spot color or the spot color combination not included in the second table exists at a pixel of the plurality of second data, the conversion section adds the spot color identification information on the spot color or the spot color combination to the second table.

According to the recording medium, unnecessary processing can be omitted by adding, among the spot colors shown in the first table and spot color combinations obtainable from the first table, only necessary spot colors and/or spot color combinations to the second table.

This application is based upon and claims the benefit of priority under 35 USC 119 of Japanese Patent Application No. 2011-114391 filed on May 23, 2011, the entire disclosure of which, including the description, claims, drawings, and abstract, is incorporated herein by reference in its entirety.

What is claimed is:

1. An image processing apparatus which processes image data including: first data corresponding to an output color of an output device; and a plurality of second data of respective spot colors, the image processing apparatus comprising:
   a conversion section which (i) calculates a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generates, based on the plurality of second data, third data in which each pixel is represented by the spot color identification information; and
   a storage section which stores the first data, the second table and the third data.

2. The image processing apparatus according to claim 1 further comprising:
   a combination section which (i) obtains, for each pixel of the third data, the device color value correlated with the spot color identification information, referring to the second table, so as to generate fourth data based on the obtained device color value, and (ii) combines the generated fourth data with the first data.

3. The image processing apparatus according to claim 1 further comprising:
   an adjustment section which, when the first table is changed, changes the second table stored in the storage section based on the changed first table.

4. The image processing apparatus according to claim 1, wherein when the spot color or the spot color combination not included in the second table exists at a pixel of the plurality of second data, the conversion section adds the spot color identification information on the spot color or the spot color combination to the second table.

5. An image processing method for processing image data including: first data corresponding to an output color of an output device; and a plurality of second data of respective spot colors, the image processing method comprising:
   a conversion step of (i) calculating a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generating, based on the plurality of second data, third data in which each pixel is represented by the spot color identification information; and
   a storage step of storing the first data, the second table and the third data.

6. The image processing method according to claim 5 further comprising:
   a combination step of (i) obtaining, for each pixel of the third data, the device color value correlated with the spot color identification information, referring to the second table, so as to generate fourth data based on the obtained device color value, and (ii) combining the generated fourth data with the first data.

7. The image processing method according to claim 5 further comprising:
   an adjustment step of, when the first table is changed, changing the second table stored in the storage section based on the changed first table.

8. The image processing method according to claim 5, wherein when the spot color or the spot color combination not included in the second table exists at a pixel of the plurality of second data, the spot color identification information on the spot color or the spot color combination is added to the second table in the conversion step.

9. A non-transitory computer readable recording medium storing a program making a computer, which processes image data including: first data corresponding to an output color of an output device; and a plurality of second data of respective spot colors, function as:
   a conversion section which (i) calculates a device color value corresponding to a spot color or a spot color combination among the spot colors, referring to a first table in which each of the spot colors is correlated with the device color value corresponding to the output color of the output device, so as to generate a second table in which spot color identification information on the spot color or the spot color combination is correlated with the calculated device color value, and (ii) generates, based on the plurality of second data, third data showing in which each pixel is represented by the spot color identification information; and
   a storage section which stores the first data, the second table and the third data.

10. The non-transitory computer readable recording medium according to claim 9, wherein the program makes the computer further function as:
    a combination section which (i) obtains, for each pixel of the third data, the device color value correlated with the spot color identification information, referring to the second table, so as to generate fourth data based on the obtained device color value, and (ii) combines the generated fourth data with the first data.

11. The non-transitory computer readable recording medium according to claim 9, wherein the program makes the computer further function as:
    an adjustment section which, when the first table is changed, changes the second table stored in the storage section based on the changed first table.

12. The non-transitory computer readable recording medium according to claim 9, wherein when the spot color or the spot color combination not included in the second table exists at a pixel of the plurality of second data, the conversion section adds the spot color identification information on the spot color or the spot color combination to the second table.

* * * * *